(12) United States Patent
Dandekar et al.

(10) Patent No.: US 8,834,823 B2
(45) Date of Patent: Sep. 16, 2014

(54) CATALYTIC REDUCTION OF NOX WITH HIGH ACTIVITY CATALYSTS

(71) Applicants: Ajit B. Dandekar, Falls Church, VA (US); Richard F. Socha, Yardley, PA (US); Richard L. Eckes, Madison, NJ (US); S. Beau Waldrup, Lumberton, TX (US)

(72) Inventors: Ajit B. Dandekar, Falls Church, VA (US); Richard F. Socha, Yardley, PA (US); Richard L. Eckes, Madison, NJ (US); S. Beau Waldrup, Lumberton, TX (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 13/938,590

(22) Filed: Jul. 10, 2013

(65) Prior Publication Data

US 2014/0044636 A1    Feb. 13, 2014

Related U.S. Application Data

(60) Provisional application No. 61/681,251, filed on Aug. 9, 2012.

(51) Int. Cl.
 *B01D 53/56* (2006.01)
 *B01D 53/81* (2006.01)

(52) U.S. Cl.
 USPC ........................................ 423/239.1; 422/177

(58) Field of Classification Search
 CPC ...... B01D 53/56; B01D 53/565; B01D 53/81; B01D 53/82; B01D 53/8628

USPC ........................................ 423/239.1; 422/177
See application file for complete search history.

(56) References Cited

U.S. PATENT DOCUMENTS

| | | | | |
|---|---|---|---|---|
| 3,961,020 A | * | 6/1976 | Seki | 423/239.1 |
| 4,210,628 A | | 7/1980 | Ninomiya et al. | |
| 4,921,826 A | * | 5/1990 | Juntgen et al. | 502/180 |
| 5,064,801 A | * | 11/1991 | Juntgen et al. | 502/180 |
| 5,589,147 A | | 12/1996 | Farnos et al. | |
| 6,106,791 A | * | 8/2000 | Mochida et al. | 423/239.1 |
| 6,541,408 B2 | | 4/2003 | Chang et al. | |
| 7,011,801 B2 | | 3/2006 | Van Den Brink et al. | |
| 7,163,668 B2 | | 1/2007 | Bartley et al. | |

(Continued)

FOREIGN PATENT DOCUMENTS

| | | |
|---|---|---|
| CA | 2079176 A1 | 4/1993 |
| EP | 0077424 A1 | 4/1983 |

(Continued)

OTHER PUBLICATIONS

Aksoylu et al., "Highly Dispersed Activated Carbon Supported Platinum Catalysts Prepared by OMCVD: A Comparison With Wet Impregnated Catalysts", Applied Catalysis A: General, vol. 243, pp. 357-365 (2003).

(Continued)

*Primary Examiner* — Timothy Vanoy
(74) *Attorney, Agent, or Firm* — Glenn T. Barrett

(57) ABSTRACT

Methods and systems for selective catalytic reduction of NOx with an activated-carbon-supported metal catalyst at an operating temperature of between about between about 500° C. and about 750° C. An exhaust stream including NOx is introduced to a catalytic reactor having the activated-carbon-supported metal catalyst for NOx reduction of at least 90%. A second catalyst reactor can be provided downstream to remove or convert nitrous oxide as desired.

33 Claims, 4 Drawing Sheets

(56) References Cited

U.S. PATENT DOCUMENTS

| | | | |
|---|---|---|---|
| 7,485,271 | B2 | 2/2009 | Golunski et al. |
| 7,743,602 | B2 | 6/2010 | Kalyanaraman et al. |
| 7,803,338 | B2 | 9/2010 | Socha et al. |
| 7,891,171 | B2 | 2/2011 | Cho et al. |
| 7,976,697 | B2 | 7/2011 | Krishnamoorthy et al. |
| 8,575,058 | B2 * | 11/2013 | Henning et al. ............ 502/180 |
| 2005/0163691 | A1 | 7/2005 | Kelkar et al. |
| 2007/0092421 | A1 | 4/2007 | Hancu et al. |
| 2008/0167178 | A1 | 7/2008 | Malyala et al. |
| 2008/0241006 | A1 | 10/2008 | Sato |
| 2009/0081097 | A1 | 3/2009 | Mochida et al. |
| 2009/0304566 | A1 | 12/2009 | Golden et al. |

FOREIGN PATENT DOCUMENTS

| | | |
|---|---|---|
| EP | 0719580 A1 | 7/1996 |
| EP | 2298434 A1 | 3/2011 |
| EP | 2371450 A1 | 10/2011 |
| WO | 0174475 A1 | 10/2001 |

OTHER PUBLICATIONS

PCT Search Report issued Nov. 22, 2013 in corresponding PCT Application No. PCT/US2013/051648 (4 pp.).

PCT Written Opinion issued Nov. 22, 2013 in corresponding PCT Application No. PCT/US2013/051648 (4 pp.).

PCT Search Report issued Nov. 22, 2013 in related PCT Application No. PCT/US2013/051642 (4 pp.).

PCT Written Opinion issued Nov. 22, 2013 in related PCT Application No. PCT/US2013/051642 (5 pp.).

PCT Search Report issued Nov. 22, 2013 in related PCT Application No. PCT/US2013/051638 (3 pp.).

PCT Written Opinion issued Nov. 22, 2013 in related PCT Application No. PCT/US2013/051638 (3 pp.).

PCT Search Report issued Sep. 24, 2013 in corresponding PCT Application No. PCT/US2013/051652, Form PCT/ISA/210, 3 pages.

PCT Written Opinion issued Sep. 24, 2013 in corresponding PCT Application No. PCT/US2013/051652, Form PCT/ISA/237, 5 pages.

\* cited by examiner

CATALYTIC REDUCTION OF NOX WITH HIGH ACTIVITY CATALYSTS

CROSS REFERENCE TO RELATED APPLICATION

This application claims priority under 35 USC 120 from U.S. Provisional Application Ser. No. 61/681,251, filled 9 Aug. 2012, the contents of which are incorporated in this application by reference.

BACKGROUND

1. Field

The presently disclosed subject matter relates to methods and systems for removing pollutant gases from the exhaust gas stream formed by a combustion process, such as internal combustion engines, furnaces, power plants, and so forth. Particularly, the disclosed subject matter is related to the use of activated-carbon-supported metal catalysts for the selective catalytic reduction of nitrogen oxides (NOx) from exhaust gases resulting directly or indirectly from a combustion process in the exploration, production, refining, manufacture, supply, transport, formulation or blending of petroleum, petrochemicals or the direct products thereof.

2. Description of Related Art

Combustion devices in commercial applications, such as those in the petroleum and petrochemical processing field, which includes the exploration, production, refining, manufacture, supply, transport, formulation or blending of petroleum, petrochemicals, or the direct products thereof, are a source of NOx emissions. A continuing effort has been made over the years to develop methods and systems to remove pollutant gases from exhaust gases produced by combustion unit operations.

Increasingly stringent environmental regulations have been enacted world-wide in an effort to reduce the emission of pollutant gases into the atmosphere from combustion equipment used by numerous unit operations within a commercial operation. Of particular interest is the production of nitrogen oxides (NOx).

Nitrogen oxides (NOx) are produced, for example, when nitrogen reacts with oxygen within a combustion chamber under high temperature and pressure conditions. NOx can also be produced, for example, in fluid catalytic converters (FCCs) and furnaces due to combustion of nitrogen from FCC feeds, heating oil, and/or fuel oil. Such nitrogen oxides can include either one or a combination of nitrogen monoxide and nitrogen dioxide.

Various selective catalytic reduction (SCR) methods have been developed in an effort to reduce NOx emissions. SCR is a catalytic technique to convert NOx to diatomic nitrogen, $N_2$, and water, $H_2O$. Typically, a fluid reductant—such as anhydrous ammonia, aqueous ammonia or urea—is added to a stream of exhaust gas and absorbed onto a catalyst.

However, such known techniques can be expensive to operate and/or may have limited capacity or efficiency. As such, there is a continued need for improved methods and apparatus for removing NOx from the exhaust gas stream of a combustion device, particularly those found in chemical processing and/or petrochemical refining operations.

SUMMARY OF THE INVENTION

In accordance with one aspect of the disclosed subject matter, a method for selective catalytic reduction of NOx includes providing an exhaust stream from a combustion operation, the exhaust stream containing an amount of NOx. A portion of the exhaust stream is introduced to a catalytic reactor, which includes at least one activated-carbon-supported metal catalyst, wherein the operating temperature of the catalytic reactor is between about 500° C. and about 750° C. to reduce the amount of NOx in the exhaust stream. The NOx-reduced stream is then directed from the catalytic reactor. In one embodiment, the exhaust stream is free of an effective amount of a fluid reductant.

The source of the exhaust stream can be a refinery component, selected from the group consisting of a combustion furnace, a boiler, a heater turbine, and a fluid catalytic cracking unit. The catalytic reactor thus can be located near a flue outlet of the at least one refinery component to maintain the catalytic reactor at an operating temperature between about 500° C. and 750° C. The activated carbon-carbon-supported metal catalyst can include a metal selected from the groups consisting of transition metals, noble metals, or group 10 elements. The NOx in the exhaust stream can be reduced by at least 90%, and preferably reduced by at least 95%.

Additionally, the method can further comprise reducing an amount of nitrous oxide, if present, in the NOx-reduced exhaust stream. A portion of the NOx-reduced exhaust stream can be introduced in a second catalyst, which can be located, for example, downstream from the activated-carbon-supported metal catalyst. A fluid reductant stream including ammonia can also be introduced into the NOx-reduced exhaust stream upstream from the second catalyst. The second catalyst can be, for example, zeolite loaded with a metal, such as ZSM-5 loaded with Cu.

In accordance with another aspect of the disclosed subject matter, a system for selective catalytic reduction of NOx is provided. The system includes a conduit in fluid communication with a source of an exhaust stream containing an amount of NOx from a combustion operation. A catalytic reactor is in fluid communication with the conduit and includes at least one activated-carbon-supported metal catalyst. The catalytic reactor has an operating temperature between about 500° C. and about 750° C. to reduce the amount of NOx in the exhaust stream. An outlet is in fluid communication with the catalytic reactor to direct the NOx-reduced exhaust stream from the catalytic reactor.

In one embodiment, the source of the exhaust stream is a refinery component. The refinery component can be, for example, a combustion furnace, a boiler, a heater turbine, or a fluid catalytic cracking unit. The catalytic reactor can be located proximal to the refinery component to maintain the catalytic reactor between about 500° C. and 750° C. In other embodiments, the system can include a heat exchanger operatively coupled to heat the exhaust stream to maintain the catalytic reactor at an operating temperature between about 500° C. and 750° C. The activated carbon-carbon-supported metal catalyst can include a metal selected from the groups consisting of transition metals, noble metals, or Group 10 elements.

Additionally, the system can further comprise a second catalyst for reducing an amount of nitrous oxide in the NOx-reduced exhaust stream. A source of a fluid reductant stream including ammonia can be operatively configured to introduce the reductant stream to the NOx-reduced exhaust stream upstream from the second catalyst. The second catalyst can be, for example, zeolite loaded with a metal.

DETAILED DESCRIPTION

Figure 1:
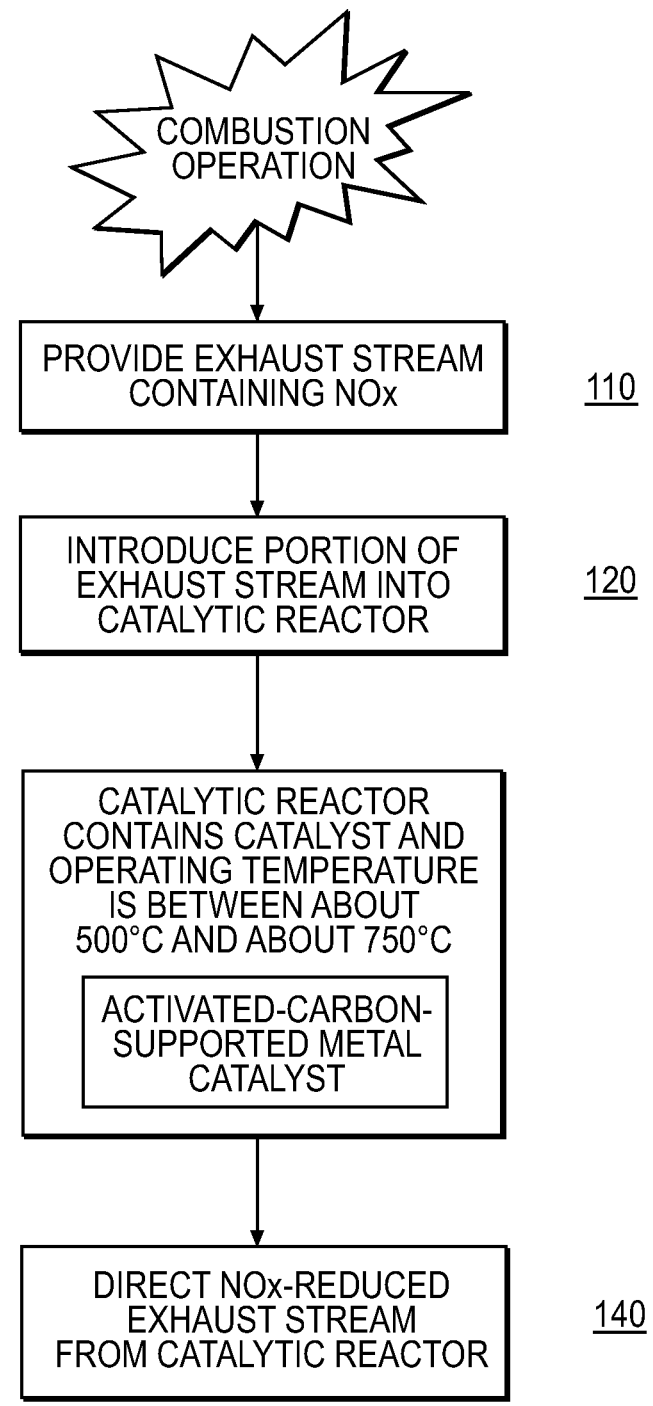
FIG. 1 is a flow diagram of a method for NOx reduction according to an embodiment of the disclosed subject matter.

As used herein, the term "NOx" refers generally to a compound consisting of nitrogen and at least one oxygen molecule, and particularly to one or more of nitrogen monoxide, nitrogen dioxide and di-nitrogen or nitrous oxide. As used herein, the term "NOx-reduced stream" can include a fluid stream having a reduction of such nitrogen monoxide, nitrogen dioxide, and di-nitrogen oxide into diatomic nitrogen and nitrous oxide, among other things.

As used herein, the term "combustion operation" refers to any process wherein energy-storing material is burned to produce energy or other byproduct. For example, a "combustion operation" can include a unit operation within a commercial operation or the like in which NOx is emitted as the result of a combustion reaction. A combustion operation can include, but is not limited to, the operation of a combustion engine, furnace, boiler, heater and a turbine. A combustion operation can further include a fluid catalytic converter ("FCC") regenerator operation, in which NOx is found in a FCC regenerator exhaust stream.

As used herein, the term "GHSV" refers to term "gaseous hourly space velocity" and is the ratio of the gaseous volumetric flow rate, at standard conditions of 60° F. and one atmosphere of pressure, to the catalyst volume.

As used herein, the term "commercial operation" refers to any operation in which a commodity (e.g., electricity), chemical, petroleum or other article of commercial interest (including a chemical intermediate to an article of commerce interest) is manufactured, produced or otherwise provided. The term "commercial operation" can include the exploration, production, refining, manufacture, supply, transport, formulation or blending of petroleum, petrochemicals, or the direct products thereof. As embodied herein, the article of commercial interest can be manufactured, produced or otherwise provided in an industrial scale.

As used herein, the term "provided in an industrial scale" refers to a scheme in which, for example, gasoline or other product of commercial interest is produced on a generally continuous basis (with the exception of necessary outages for plant maintenance or upgrades) over an extended period of time (e.g., over at least a week, or a month, or a year) with the expectation or object of generating revenues from the sale or distribution of the product of commercial interest, regardless of whether for profit or not for profit. Production in an industrial scale is distinguished from laboratory or pilot plant settings which are typically maintained only for the limited period of the experiment or investigation, and are conducted for research purposes and not with the expectation of generating revenue from the sale or distribution of the end product produced thereby.

The term "about" as used herein in reference to quantitative measurements refers to a value one of ordinary skill in the art would consider equivalent to the recited value (i.e., having the same function or result), or a value that can occur, for example, through typical measurement and process procedures.

As used herein, the term "activated-carbon-supported metal catalyst" refers to activated carbon loaded with a metal. For purpose of illustration and not limitation, the activated carbon can be prepared from steam activation from charcoal or a similar source of carbon, for example graphite. Metal loading can be accomplished with any variety of techniques known in the art. For example, the activated carbon can be loaded with a metal using a standard wet impregnation technique with metal containing salts as a precursor followed by calcination at 1000° F. in air to obtain target weight loading.

In accordance with one aspect of the disclosed subject matter, a method for selective catalytic reduction of NOx includes providing an exhaust stream from a combustion operation, the exhaust stream containing an amount of NOx. A portion of the exhaust stream is introduced to a catalytic reactor, which includes at least one activated-carbon-supported metal catalyst, wherein the operating temperature of the catalytic reactor is between about 500° C. and about 750° C. to reduce the amount of NOx in the exhaust stream. The NOx-reduced stream is then directed from the catalytic reactor. In one embodiment, the exhaust stream is free of an effective amount of a fluid reductant.

In accordance with another aspect of the disclosed subject matter, a system for selective catalytic reduction of NOx is provided. The system includes a conduit in fluid communication with a source of an exhaust stream containing an amount of NOx from a combustion operation. A catalytic reactor is in fluid communication with the conduit and includes at least one activated-carbon-supported metal catalyst. The catalytic reactor has an operating temperature between about 500° C. and about 750° C. to reduce the amount of NOx in the exhaust stream. An outlet is in fluid communication with the catalytic reactor to direct the NOx-reduced exhaust stream from the catalytic reactor.

Particular embodiments of the method and system are described below, with reference to FIG. 1 and FIG. 2, for purposes of illustration, and not limitation. For purposes of clarity the method and system are described concurrently and in conjunction with each other.

Figure 2:
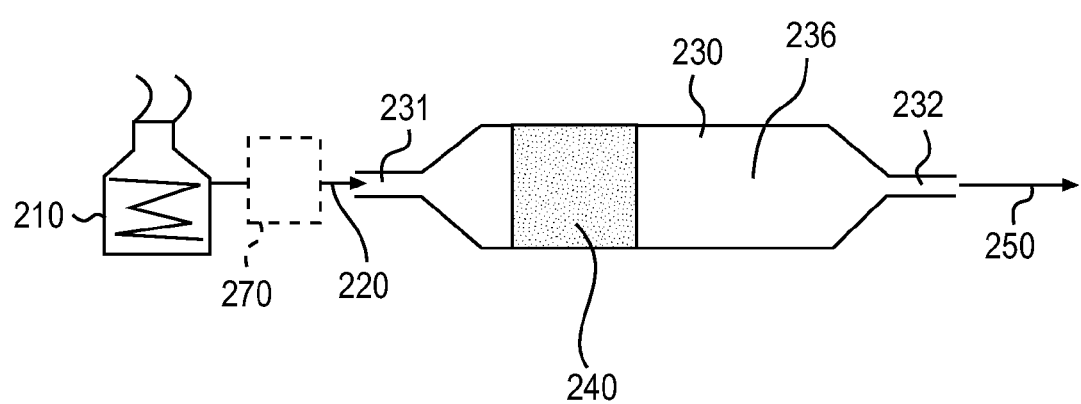
FIG. 2 is a schematic diagram of a system for NOx reduction according to an embodiment of the disclosed subject matter.

In one embodiment, and with reference to FIG. 1 and FIG. 2, an exhaust stream 220 containing NOx is provided (step 110) from a combustion operation 210. The combustion operation 210 can be any combustion operation that produces an exhaust stream containing NOx. The combustion operation can be, for example, a combustion operation in a refining operation involving a refinery component. Such refinery component can include a combustion furnace, a boiler, a heater turbine, or a fluid catalytic cracking unit among others. The combustion operation generally has a flue or similar outlet, such that the exhaust stream 220 exits the combustion operation via the flue.

The exhaust stream 220 can include other gases in addition to NOx. For example, the exhaust stream can include an amount of oxygen, water, and other byproducts of the combustion operation. In the refinery setting, for example, the exhaust stream can contain trace amounts of hydrocarbons. For purpose of example and not limitation, the exhaust stream can include up to about 20% oxygen and up to about 10% water, with no trace amount of hydrocarbons.

The exhaust stream 220 is introduced (step 120) to the catalytic reactor 230. For example, and as depicted in FIG. 2, the catalytic reactor 230 includes a vessel or similar structure of suitable construction for the intended operating conditions, and is in fluid communication with a conduit 221 extending from the source of the exhaust stream. The conduit 231 can be attached to the vessel of the catalytic reactor by suitable means and provided with a suitable inlet adapter as needed for flow of the exhaust stream to an interior chamber 236 of the vessel of the catalytic reactor 230. For example, the conduit 231 can be threaded, welded, or otherwise attached to a port in the catalytic reactor 230. In one embodiment, the catalytic reactor 230 is located proximate a refinery flue outlet of the at least one refinery component to maintain the catalytic reactor at an operating temperature between about 500° C. and about 750° C., as described further below. Alternatively, the exhaust stream 220 can first pass through one or more valves or treatment devices 270 prior to the catalytic reactor 230. For example, the exhaust stream can pass through a heat exchanger to control the temperature of the exhaust stream. Additionally or alternatively, a pump can be used to provide a desired flow rate to the catalytic reactor.

The catalytic reactor 230 includes at least one activated-carbon-supported metal catalyst 240. The activated-carbon-supported metal catalyst 240 can be structurally arranged, for example, on catalyst beds or the like within an interior chamber 236 of the catalytic reactor 230. The activated-carbon-supported metal catalyst 240 can be in a variety of suitable structural or solid forms, such as powders, pellets, particles, washcoated or formed monoliths such as a honeycomb structure and the like, to allow the exhaust stream to contact the activated-carbon-supported metal catalyst 240 within the interior chamber 236 of the catalytic reactor 230. The activated-carbon-supported metal catalyst 240 can include, for example, activated carbon produced by steam activation from charcoal or other similar source of carbon (e.g., graphite).

The activated carbon is loaded with a suitable metal to act as a catalyst to reduce the amount of NOx in the fluid exhaust stream. For example, and in accordance with one embodiment, the activated-carbon-supported metal catalyst 240 is loaded with a transition metal. Examples of such transition metals include platinum, ruthenium, cobalt, rhenium, iron, nickel, palladium, and copper. Alternatively, and in accordance with another embodiment, the activated carbon is loaded with a noble metal, such as ruthenium, palladium, rhenium, or platinum. Alternatively, and in accordance with another embodiment, the activated carbon is loaded with a Group 10 element (i.e., an element in Group 10 of an IUPAC-style Periodic Table, such as nickel, palladium, or platinum). In some embodiments, the activated-carbon-supported metal catalyst 240 can be loaded with a metal selected from the group of platinum, ruthenium, cobalt, rhenium, iron, nickel, palladium, and copper.

The weight loading of the metal in the activated-carbon-supported metal catalyst 240 will depend on the selected metal, but generally will be between about 0.001 wt. % to about 10 wt. % of the solid catalyst as a whole. Preferably, the weight loading of the metal is about 1 wt. %. The activated-carbon-supported metal catalyst 240 can be fabricated using a standard wet impregnation technique. Typically, catalyst supports (such as activated carbon) are impregnated with aqueous solutions containing dissolved metal containing salts (also known as metal precursors). This is followed c by calcination in air at 1000° F. to decompose the precursor salt and obtain target weight loading.

In accordance with the disclosed subject matter, the operating temperature of the catalytic reactor 230 is between about 500° C. and about 750° C. Combustion operations, such as in refinery equipment, often produce flue gas in the temperature range above 500° C. As such, and in one embodiment, the operating temperature of the catalytic reactor 230 is maintained at between about 500° C. and about 750° C. by locating the catalytic reactor 230 downstream from the combustion operation 210 at a location where the exhaust stream 220 is expected to have a temperature between about 500° C. and about 750° C. For example, this location can be proximate to the combustion operation 210, with the exhaust stream 220 exiting the combustion operation 210 and flowing through the conduit 231 and to the catalytic reactor 230 prior to any significant thermal energy loss.

Alternatively, the operating temperature can be maintained, for example, between about 500° C. and 750° C. with the use of a heat exchanger 270 or the like. The heat exchanger 270 can be located downstream from the exhaust flue source (i.e., the flue of the combustion operation 210) and upstream from the catalytic reactor 230. Various mechanisms and devices to modulate the temperature of a flow gas are known. For example, an air heater or economizer can be disposed in the stream. In some embodiments, the heat exchanger uses byproduct heat or thermal energy from the refinery for increased efficiency. Other suitable devices and techniques can also be suitable to maintain the operating temperature.

At operating temperatures of between about 500° C. and about 750° C., the activated carbon can react with the NOx to reduce the NOx into diatomic nitrogen. As such, the activated carbon in the activated-carbon-supported metal catalyst 240 of the disclosed subject matter acts as a solid reductant and thus eliminates the need for a fluid reductant as required in conventional catalytic reduction systems and methods. In this manner, the exhaust stream 220 likewise can be free of an effective amount of a fluid reductant. However it is understood that the exhaust stream 220 can, for example, contain residual gases from the combustion operation 210, which can, but not necessarily will, include certain amounts of hydrocarbons. The hydrocarbons, if any, are not required for the catalytic reduction of NOx in accordance with the disclosed subject matter.

As demonstrated in the Examples below, the system and method disclosed herein can achieve NOx reduction of greater than 90%, and more preferably greater than 95%. The flow rate of the exhaust stream 220 through the catalytic reactor 230 therefore can be controlled or maintained at a desired level through the catalytic reactor 230 to utilize or maximize the capacity of the catalytic reactor. For example, flow regulators and/or pumps or the like, such as an induced-draft fan can be disposed in fluid communication with the system disclosed herein to maintain a desired flow rate through the catalytic reactor 230. With reference to the disclosed system and method, the GHSV can be, for example, between about 30K cc per hour and about 120K cc per hour. As embodied herein, GHSVs can be between about 30K cc per hour and about 120K cc per hour based on a catalyst provided in powder form. Likewise, the GHSV can be at least 5000 cc per hour, for example, where the catalyst is provided on washcoated or bulk monoliths.

As noted above, the flow of the exhaust stream 220 over the activated-carbon-supported metal catalyst 240 reduces NOx into diatomic nitrogen. That is, and merely for purpose of explanation and not limitation, the reaction generally includes one or more of the following:

$$2NO + 2C + O_2 = N_2 + 2CO_2 \qquad (1)$$

$$2NO + C = N_2 + CO_2 \qquad (2)$$

After the NOx in the exhaust stream 220 is reduced in the catalytic reactor 230, the NOx-reduced exhaust stream 250 is directed (step 140) from the catalytic reactor. For example, and as embodied in FIG. 2, the NOx-reduced exhaust stream 250 flows from the catalytic reactor 230 through an outlet conduit 232. The outlet conduit 232 can be in fluid communication with the downstream end of the catalytic reactor 230 and additional downstream processing systems.

Under certain operating parameters, certain embodiments of the system disclosed herein can, in addition to equations 1 and 2, allow for additional reactions. For purpose of example and not limitation, these reactions can include one or more of the following:

$$4NO + 2C + O_2 = 2N_2O + 2CO_2 \quad (3)$$

$$4NO + C = 2N_2O + CO_2 \quad (4)$$

Under these operating conditions, methods and systems of the disclosed subject matter can further include reducing the nitrous oxide ($N_2O$) in the NOx reduced exhaust stream 250. In the event that nitrous oxide, as well as other nitrogen-containing intermediates, are generated in this phase, the NOx reduced stream containing these intermediate species as well as any residual NOx (the NOx not reduced in the first phase) can be directed to a second catalyst to reduce such intermediate species and residual NOx to $N_2$, as will be further described below.

Figure 3:
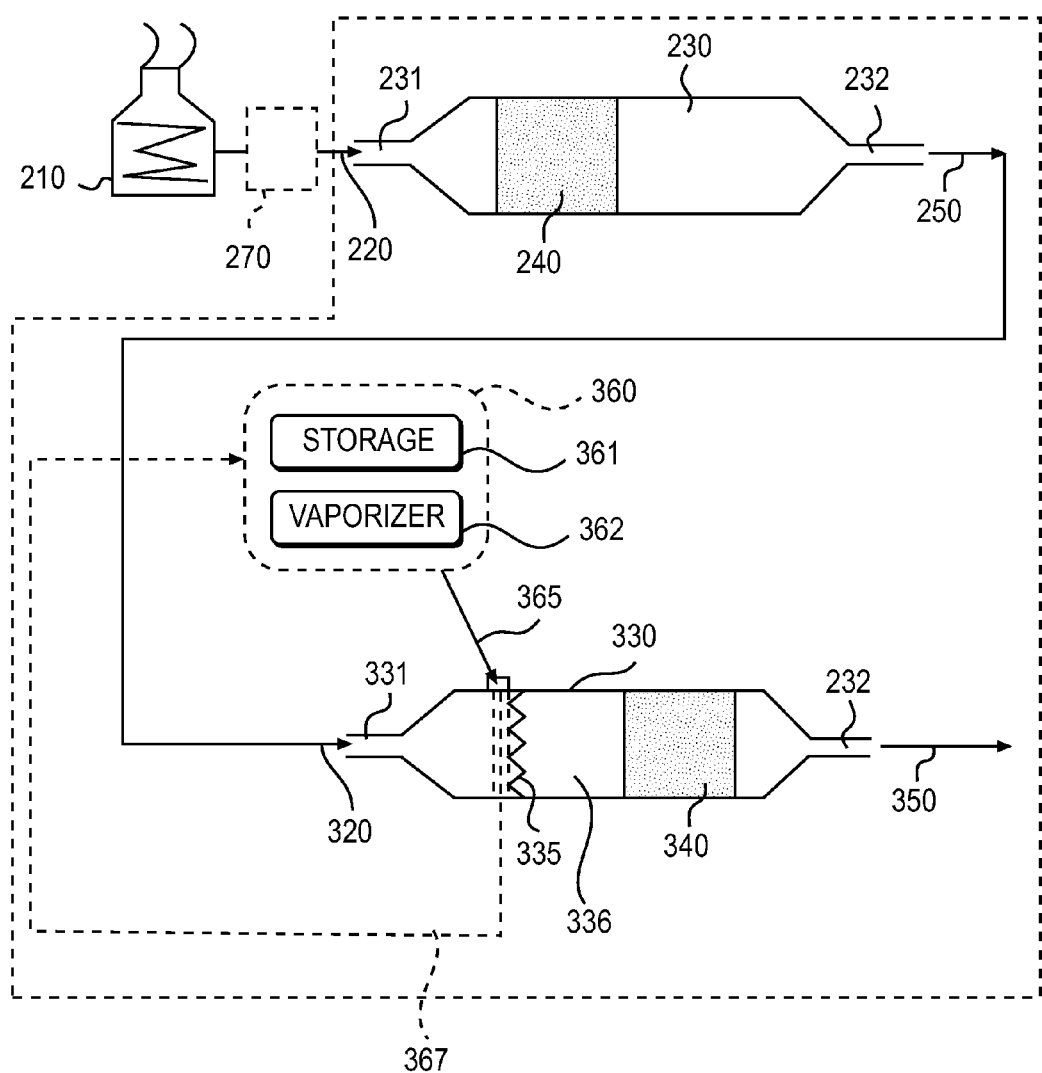
FIG. 3 is a schematic diagram of a system for NOx reduction according to another embodiment of the disclosed subject matter.

In accordance with one embodiment, and with reference to FIG. 3, and as noted above, the second catalyst 340 can include, for example, zeolite loaded with a metal, such as ZSM-5 loaded with Cu. The second catalyst 340 can be structurally arranged, for example, on catalyst beds or the like in a second catalytic reactor 330, and can be in the form of powders, pellets, particles, washcoated or formed monoliths such as a honeycomb structure, and the like. For example, the NOx-reduced exhaust stream 250 can be directed from the catalytic reactor for the first catalyst, i.e. the first catalytic reactor, (FIG. 1, step 140) to a second catalytic reactor 330 located downstream from the first catalytic reactor 230.

As embodied herein, the second catalytic reactor 330 can be located a distance downstream from the first catalytic reactor 230 such that the operating temperature of the second catalytic reactor 330 can be cooler than that of the first catalytic reactor. For example, in one embodiment the operating temperature of the first catalytic reactor 230 is between about 500° C. and about 750° C., whereas the operating temperature of the second catalytic reactor 330 is between about 200° C. and about 250° C. As the NOx-reduced exhaust stream 250 flows from the first catalytic reactor 230, the NOx-reduced exhaust stream loses thermal energy to the environment. The second catalytic reactor 330 therefore can be located downstream from the first catalytic rector 230 to ensure the temperature of the NOx-reduced exhaust stream 250 within the second catalytic reactor 330 is between about 200° C. and about 250° C. Additionally or alternatively, the NOx-reduced exhaust stream 250 can flow through a heat exchanger to achieve a desired temperature at the second catalytic reactor 330.

A fluid reductant stream 365 can be introduced to the second catalytic reactor 330. The fluid reductant stream 365 can include, for example and as embodied herein, ammonia. The fluid reductant stream 365 can be provided from a suitable source 360, such as a storage vessel 361 for storing ammonia. In some embodiments, the ammonia can be stored as a liquid. Where ammonia is stored as a liquid, the reductant stream source 360 can include a vaporizer 362 to convert the liquid ammonia to a gas. The vaporizer 362 can include, for example, a fan and an air heater. The reductant stream source 360 can also include one or more pumps and/or valves to control flow of the fluid reductant stream. For example, a pump can be disposed in fluid communication with the storage vessel 361 and the vaporizer 362. A control valve can be located downstream from the pump. The control valve can be opened or closed, for example, by an actuator, and the pump can pump liquid ammonia to the vaporizer. The vaporizer 362 can convert the liquid ammonia to a gas. The gas can then be fed into a mixer, and the mixer can provide the fluid reductant stream 365 to the second catalytic reactor 330.

The second catalytic reactor 330 can include a vessel or similar suitable structure and can have a port in fluid communication with the reductant stream source 360 to receive the fluid reductant stream 365. The port can include a valve, or a plurality of valves to regulate the flow rate of the reductant stream. Additionally, the vessel of the second catalytic reactor 330 can have a spray nozzle, or series of spray nozzles 335, in fluid communication with the port, such that the reductant stream 365 can flow from the reductant stream source 360 through the port and through the spray nozzles 335 to the interior chamber 336 of the vessel of the catalytic reactor. In the interior chamber 336 of the second catalytic reactor, the reductant stream 365 can mix with the NOx-reduced exhaust stream 250.

Additionally, the vessel of the second catalytic reactor 330 can have an outlet port to recycle excess ammonia back to the reductant stream source 360. In this manner, the flow from the outlet port 367 can pass through a system to regulate and process the recycled ammonia. Such systems are known in the art, and can include, among other things, one or more pump, valve, actuator, and/or control unit.

As embodied herein, and with reference to the use of ammonia as a fluid reductant, the second catalytic reactor 330 can include at least one zeolite catalyst 340 loaded with a metal or combination of metals. The catalyst 340 can be structurally arranged, for example, on catalyst beds or the like within the second catalytic reactor 330, and can be in the form of powders, pellets, particles, washcoated or formed monoliths such as a honeycomb structure, and the like. The zeolite catalyst 340 can be loaded with, for example, 2 wt. % copper. Alternatively, the zeolite catalyst 340 can be loaded with iron or another metal suitable to facilitate the catalytic reduction of nitrous oxide. The zeolite can be, for example, ZSM-5, or other suitable zeolite.

The flow of the NOx-reduced exhaust stream 250 and the reductant stream 365 over the second catalyst 340 decomposes at least a portion of the nitrous oxide in the NOx-reduced exhaust stream 250 into diatomic nitrogen. Additionally, the second catalyst 340 can further reduce any residual NOx included in the NOx-reduced exhaust stream 250. The flow rate of the NOx-reduced exhaust stream 250 and the reductant stream 365 can be maintained at a desired level through the second catalytic reactor 330 with the use of various pumps and fans. For example, an induced-draft fan can be disposed in fluid communication with the system disclosed herein to maintain a desired flow rate through the second catalytic reactor 330. The GHSV can be, for example, between about 30K cc per hour and about 120K cc per hour. As embodied herein, GHSVs can be between about 30K cc per hour and about 120K cc per hour based on a catalyst provided in powder form. Likewise, the GHSV can be at least 5000 cc per hour, for example where the catalyst is provided on washcoated or bulk monoliths.

After the NOx-reduced exhaust stream 250 flows through the second catalyst, the further reduced NOx-reduced exhaust stream 350 can be directed from the second catalytic reactor 330. For example, the further reduced NOx-reduced exhaust stream 350 can flow through an outlet conduit 332. The outlet conduit 332 can be in fluid communication with the downstream end of the vessel of the second catalytic reactor 330. The further reduced NOx-reduced exhaust stream can then be released into the atmosphere, for example through a stack.

Figure 4:
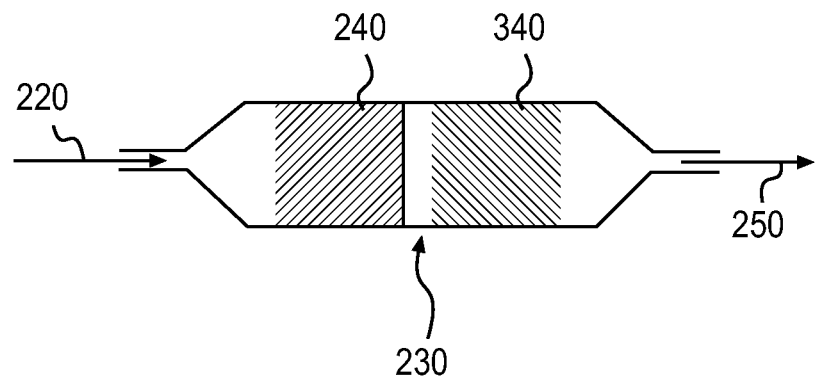
FIG. 4 is a schematic diagram of a system for NOx reduction according to an alternative embodiment of the disclosed subject matter.

As an alternative to providing a second catalytic reactor, the second catalyst 340 can be located within the vessel of the first catalytic reactor such as depicted by the dotted line in FIG. 3. For example, and with reference to FIG. 4, an amount of nitrous oxide in the NOx-reduced exhaust stream can be reduced with the use of a second catalyst located in the same catalytic reactor as the activated-carbon-supported metal catalyst. The two catalysts (240 and 340) can be spaced apart within the catalytic reactor 230, arranged, for example, in stacks or the like. In this embodiment the fluid reductant stream can be introduced upstream of the second catalyst.

For example, the second catalyst bed can be disposed downstream of the activated-carbon-supported metal catalyst bed, and the fluid reductant can be introduced either upstream of the activated-carbon-supported metal catalyst bed, or downstream if desired. Suitable measures can be used to control operating conditions of the separate catalyst beds as needed, such as baffles and isolating walls or the like.

Although the use of ammonia and a zeolite catalyst is disclosed herein, other known methods of reducing or converting nitrous oxide can be used downstream of and in combination with the activated-carbon-supported metal catalyst of the disclosed subject matter. For example, the NOx-reduced exhaust stream can be removed with a nitrous oxide scrubber. Nitrous oxide is known to be soluble in water, and thus a water scrubber can be employed to remove nitrous oxide from the NOx-reduced exhaust stream.

EXAMPLE

The present application is further described by means of the examples, presented below. The use of such examples is illustrative only and in no way limits the scope and meaning of the invention or of any exemplified term. Likewise, this application is not limited to any particular preferred embodiments described herein. Indeed, many modifications and variations of the invention will be apparent to those skilled in the art upon reading this specification. The invention is to be understood by the terms of the appended claims along with the full scope of equivalents to which the claims are entitled.

A gas mixture consisting of about 250 ppm of NO, about 2% $O_2$, and about 5% $H_2O$ is treated with an activated-carbon-supported metal catalyst. The total flow rate is such that the GHSV ranged from 30K to 120K cc per hour. The operating temperature is within a range of about 500° C. and about 750° C. No fluid reductant was introduced.

Activated-carbon-supported metal catalysts were prepared with a standard wet impregnation technique with corresponding metal containing salts as a precursor followed by calcination at 1000° F. in air to obtain target weight loading of 1 wt. %. Table 1 provides observed NO conversions of the gas mixture referenced above for the different metals loaded on activated carbon as summarized below.

TABLE 1

| Catalyst Description | NOx Reduction (%) |
| --- | --- |
| Pt/AC | 99.9 |
| Ru/AC | 99.9 |
| Co/AC | 99.9 |
| Re/AC | 97.2 |
| Fe/AC | 97.1 |
| Ni/AC | 97.0 |
| Pd/AC | 96.9 |
| Cu/AC | 96.6 |

In summary, the activated-carbon-supported metal catalysts disclosed herein yield NOx conversion rates of above 95% without the need for a fluid reductant when operated within a range of about 500° C. and about 750° C.

The presently disclosed subject matter is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

The invention claimed is:

1. A method for selective catalytic reduction of NOx comprising:
   providing an exhaust stream from a combustion operation, the exhaust stream containing an amount of NOx;
   introducing at least a portion of the exhaust stream to a catalytic reactor comprising at least one activated-carbon-supported metal catalyst, the operating temperature of the catalytic reactor being between about 500° C. and about 750° C. to reduce the amount of NOx in the exhaust stream; and
   directing the NOx-reduced exhaust stream from the catalytic reactor.

2. The method of claim 1, wherein the exhaust stream is free of an effective amount of fluid reductant.

3. The method of claim 1, wherein the exhaust stream is provided from at least one refinery component selected from the group consisting of a combustion furnace, a boiler, a heater turbine, and a fluid catalytic cracking unit.

4. The method of claim 3, wherein the catalytic reactor is located near a flue of the at least one refinery component to maintain the catalytic reactor between about 500° C. and 750° C.

5. The method of claim 1, wherein the operating temperature of the catalytic reactor is maintained between about 500° C. and about 750° C. by heating the exhaust stream.

6. The method of claim 1, wherein the exhaust stream includes between about 1% and about 20% oxygen and between about 1% and about 10% water.

7. The method of claim 1, wherein the exhaust stream has a gaseous hourly space velocity of at least about 5000 cc per hour.

8. The method of claim 1, wherein the exhaust stream has a gaseous hourly space velocity between about 30K cc per hour and about 120K cc per hour.

9. The method of claim 1, wherein the activated-carbon-supported metal catalyst includes a transition metal.

10. The method of claim 1, wherein the activated-carbon-supported metal catalyst includes a noble metal.

11. The method of claim 1, wherein the activated-carbon-supported metal catalyst includes a Group 10 element.

12. The method of claim 1, wherein the activated-carbon-supported metal catalyst includes one of the group consisting of platinum, ruthenium, cobalt, rhenium, iron, nickel, palladium, and copper.

13. The method of claim 1, wherein the amount of NOx is reduced by at least 90%.

14. The method of claim 1, further comprising reducing an amount of N2O in the NOx-reduced exhaust stream.

15. The method of claim 14, wherein reducing the amount of N2O comprises introducing the at least a portion of the NOx-reduced exhaust stream to a second catalyst.

16. The method of claim 15, wherein a fluid reductant stream including ammonia is introduced into the NOx-reduced exhaust stream upstream of the second catalyst.

17. The method of claim 15, wherein the catalytic reactor includes a vessel and the second catalyst is within the vessel of the catalytic reactor.

18. The method of claim 15, wherein the second catalyst is in a second catalytic reactor, the second catalytic reactor located downstream of the catalytic reactor.

19. The method of claim 15, wherein the second catalyst comprises a zeolite loaded with a metal.

20. The method of claim 15, wherein the second catalyst comprises Cu loaded on ZSM-5.

21. The method of claim 15, wherein the operating temperature of the second catalyst is between about 200° C. and about 250° C.

22. A system for selective catalytic reduction of NOx comprising:
a conduit in fluid communication with a source of an exhaust stream from a combustion operation, the exhaust stream containing an amount of NOx;
a heat exchanger operatively coupled to the conduit to heat the exhaust stream to maintain the catalytic reactor at between about 500° C. and about 750° C.;
a catalytic reactor in fluid communication with the conduit, the catalytic reactor comprising at least one activated-carbon-supported metal catalyst, the operating temperature of the catalytic reactor being between about 500° C. and about 750° C. to reduce the amount of NOx in the exhaust stream; and
an outlet in fluid communication with the catalytic reactor to direct the NOx reduced exhaust stream from the catalytic reactor.

23. The system of claim 22, wherein the source of the exhaust stream is a refinery component selected from the group consisting of a combustion furnace, a boiler, a heater turbine, and a fluid catalytic cracking unit.

24. The system of claim 22, wherein the at least one activated-carbon-supported metal catalyst includes a noble metal selected from platinum, ruthenium, rhenium, or palladium.

25. A system for selective catalytic reduction of NOx comprising:
a conduit in fluid communication with a source of an exhaust stream from a combustion operation, the exhaust stream containing an amount of NOx;
a catalytic reactor in fluid communication with the conduit, the catalytic reactor comprising at least one activated-carbon-supported noble metal catalyst, the operating temperature of the catalytic reactor being between about 500° C. and about 750° C. to reduce the amount of NOx in the exhaust stream; and
an outlet in fluid communication with the catalytic reactor to direct the NOx reduced exhaust stream from the catalytic reactor.

26. A system for selective catalytic reduction of NOx comprising:
a conduit in fluid communication with a source of an exhaust stream from a combustion operation, the exhaust stream containing an amount of NOx;
a catalytic reactor in fluid communication with the conduit, the catalytic reactor comprising at least one activated-carbon-supported metal catalyst, the operating temperature of the catalytic reactor being between about 500° C. and about 750° C. to reduce the amount of NOx in the exhaust stream; and
an outlet in fluid communication with the catalytic reactor to direct the NOx reduced exhaust stream from the catalytic reactor;
a second catalyst in fluid communication with the outlet and operatively configured to reduce an amount of nitrous oxide in the NOx-reduced exhaust stream.

27. The system of claim 26, further comprising a source of a fluid reductant stream including ammonia operatively configured to introduce the reductant stream upstream from the second catalyst.

28. The system of claim 27, wherein the catalytic reactor includes a vessel and the second catalyst is within the vessel of the catalytic reactor.

29. The system of claim 27, wherein the second catalyst is in a second catalytic reactor, the second catalytic reactor located downstream from the catalytic rector.

30. The system of claim 26, wherein the second catalyst comprises a zeolite loaded with a metal.

31. The system of claim 26, wherein the second catalyst comprises Cu loaded on ZSM-5.

32. The system of claim 26, wherein the second catalyst is located downstream from the catalytic reactor to maintain the operating temperature of the second catalyst is between about 200° C. and about 250° C.

33. The system of claim 26, further comprising a heat exchanger operatively coupled to heat the NOx-reduced exhaust stream to maintain the second catalyst at between about 200° C. and about 250° C.

\* \* \* \* \*